US005085051A

United States Patent [19]

Hirata

[11] Patent Number: 5,085,051

[45] Date of Patent: Feb. 4, 1992

[54] DISPLACEMENT OF VARIABLE DISPLACEMENT PUMP CONTROLLED BY LOAD SENSING DEVICE HAVING TWO SETTINGS FOR LOW AND THIGH SPEED OPERATION OF AN ACTUATOR

[75] Inventor: Toichi Hirata, Ushiku, Japan

[73] Assignee: Hitachi Construction Machinery Co., Ltd., Tokyo, Japan

[21] Appl. No.: 373,337

[22] Filed: Jun. 28, 1989

[30] Foreign Application Priority Data

Jun. 29, 1988 [JP] Japan ................................ 63-159221

[51] Int. Cl.[5] ............................................ F16B 31/02

[52] U.S. Cl. ........................................ 60/368; 60/450; 60/452

[58] Field of Search .................. 60/450, 452, 368, 443

[56] References Cited

U.S. PATENT DOCUMENTS 4,282,898 11/1981 Harmon .
4,292,805 10/1981 Acheson ........................... 60/452 X
4,379,389 4/1983 Liesener ............................ 60/452 X
4,487,018 11/1984 Budzich .
4,523,430 6/1985 Masuda ............................. 60/452 X
4,617,854 10/1986 Kropp .

FOREIGN PATENT DOCUMENTS 58-174707 10/1983 Japan .
1599233 9/1981 United Kingdom .

*Primary Examiner*—Edward K. Look
*Assistant Examiner*—F. Daniel Lopez
*Attorney, Agent, or Firm*—Fay, Sharpe, Beall, Fagan, Minnich & McKee

[57] ABSTRACT

A hydraulic drive system has a variable displacement type pump, at least one hydraulic actuator driven by hydraulic fluid and a directional control valve for controlling a flow of the hydraulic fluid supplied to the actuator. The flow rate of the hydraulic fluid discharged from the hydraulic pump is controlled by a drive device that drives a displacement volume varying device of the hydraulic pump. A load-sensing control device controls the operation of the drive device and is responsive to a differential pressure between a discharge pressure of the hydraulic pump and a load pressure of the actuator to thereby hold the differential pressure at a setting value. The drive system further has an instruction device that instructs a change in the differential pressure between the discharge pressure of the hydraulic pump and the load pressure of the actuator. The instruction is received by a differential pressure setter capable of changing the setting value of the differential pressure.

5 Claims, 5 Drawing Sheets

DISPLACEMENT OF VARIABLE DISPLACEMENT PUMP CONTROLLED BY LOAD SENSING DEVICE HAVING TWO SETTINGS FOR LOW AND THIGH SPEED OPERATION OF AN ACTUATOR

BACKGROUND OF THE INVENTION

The present invention relates to a hydraulic drive system equipped on hydraulic machines such as hydraulic excavators, and more particularly to a hydraulic drive system suitable for load-sensing control in which the discharge rate of a hydraulic pump is controlled to hold a differential pressure between a discharge pressure of the hydraulic pump and a load pressure of an actuator at a setting value.

A load-sensing control hydraulic drive system of the prior art comprises, as described in U.S. Pat. No. 4,617,854, a hydraulic pump of the variable displacement type, at least one hydraulic actuator driven by a hydraulic fluid discharged from the hydraulic pump, a directional control valve for controlling a flow of the hydraulic fluid supplied from the hydraulic pump to the actuator, and discharge control means for controlling a flow rate of the hydraulic fluid discharged from the hydraulic pump. The discharge control means comprises displacement volume varying means for the hydraulic pump, e.g., a drive cylinder unit for driving a swash plate, and a control valve for controlling operation of the drive cylinder unit. The control valve has a pair of drive parts opposite to each other, to which are respectively introduced a discharge pressure of the hydraulic pump and a load pressure of the actuator. The drive part to which is introduced the load pressure is provided with a spring for setting a differential pressure.

When the directional control valve is operated with the hydraulic pump set in a driving state, the hydraulic fluid is supplied for the hydraulic pump to the actuator via the directional control valve for driving the actuator. During this time, the control valve is operated responsive to a differential pressure between the discharge pressure of the hydraulic pump and the load pressure of the actuator for controlling operation of the drive cylinder unit. The discharge rate of the hydraulic pump is thus controlled such that the differential pressure is held at a setting value corresponding to a force of the spring.

In the hydraulic drive system as constructed above, the differential pressure between the discharge pressure of the hydraulic pump and the load pressure of the actuator becomes a unique value in accordance with the spring force. Therefore, the relationship between a stroke of the lever for the directional control valve and an operating speed of the actuator is antinomic such that the maximum speed would be lowered if the relationship is set to give a characteristic of small slope for enlarging the metering region, whereas the metering capability would be deteriorated if the relationship is set to give a characteristic of large slope for increasing the maximum speed. In view of this antinomic nature, the relationship is usually set to give a characteristic of large slope at the expense of the metering region with greater emphasis given to the working capability. Accordingly, even when the control lever of the directional control valve is shifted to a small extent in an attempt to operate the actuator slightly to carry out fine operation of a working member (not shown) driven by the actuator, the fine operation is restricted by the actuator speed dependent on a characteristic of large slope in the conventional hydraulic drive system. Specifically, the characteristic of large slope leads to the increased ratio of the stroke of the control lever to the actuator speed, making it difficult to obtain operation of the working member at a finely adjusted speed. The desired operation of the working member is thus hard to achieve. Further, when carrying out the fine operation, an operator tends to feel much more fatigued with the reduced metering region.

By way of example, such fine operation is needed in the digging work performed by hydraulic excavators. In the exemplified fine operation, a boom, an arm, a bucket, etc. provided as the working members are operated to carefully dig the earth around pipes or the like while keeping the working members from contacting with those pipes buried in the ground.

SUMMARY OF THE INVENTION

The present invention has been made in view of the situations of the prior art as stated hereinbefore, and has for its object to provide a hydraulic drive system which can easily realize operation of an actuator at a finely adjusted speed.

To achieve the above object, the present invention is directed to a hydraulic drive system comprising a hydraulic pump of the variable displacement type having displacement volume varying means, at least one hydraulic actuator driven by a hydraulic fluid discharged from the hydraulic pump, a directional control valve for controlling a flow of the hydraulic fluid supplied from the hydraulic pump to the actuator, and discharge control means for controlling a flow rate of the hydraulic fluid discharged from the hydraulic pump, the discharge control means comprising drive means for driving the displacement volume varying means and load-sensing control means for controlling operation of the drive means responsive to a differential pressure between a discharge pressure of the hydraulic pump and a load pressure of the actuator to thereby hold the differential pressure at a setting value, wherein the hydraulic drive system further comprises instruction means operated from the exterior for instructing a change in the differential pressure between the discharge pressure of the hydraulic pump and the load pressure of the actuator; and differential pressure setting means capable of changing the setting value of the differential pressure in response to an instruction from the instruction means.

When no change in the differential pressure is instructed from the instruction means, the differential pressure setting means sets an ordinary differential pressure target value suitable for the ordinary work. When a change in the differential pressure is instructed from the instruction means, the differential pressure setting means sets a differential pressure target value smaller than usual and suitable for the work which requires fine operation. Thus, since the setting value of the differential pressure becomes larger during the ordinary work, the displacement volume of the hydraulic pump is controlled such that the differential pressure between the discharge pressure of the hydraulic pump and the load pressure of the actuator is held at that larger setting value, thereby supplying the hydraulic fluid from the hydraulic pump to the actuator at a relatively large flow rate. This permits an increase in the actuator speed for carrying out the ordinary work. On the contrary, since the setting value of the differential pressure becomes smaller during the work which requires fine operation, the displacement volume of the hydraulic pump is so controlled as to hold the differential pressure at that smaller setting value, thereby supplying the hydraulic fluid from the hydraulic pump to the actuator at a relatively small flow rate. This permits an operation of the actuator at a finely adjusted speed for carrying out work which requires fine operation.

In a hydraulic drive system in which the loadsensing control means includes a control valve having a spring for setting the differential pressure and operated responsive to the differential pressure, the differential pressure setting means preferably includes a controller comprising storage means for storing at least one differential pressure modifying value, and arithmetic means for, in response to the instruction from the instruction means, determining whether to select the stored differential pressure modifying value and then outputting a control signal corresponding to the differential pressure modifying value when it is selected; and control force applying means for applying a control force corresponding to the control signal output from the arithmetic means to one of dirve parts of the control valve opposite to each other. In this case, the control force applying means can apply the control force in the same direction as or in a direction opposited to the spring force.

Alternatively, in a hydraulic drive system in which the load-sensing control means includes detector means for detecting the differential pressure between the discharge pressure of the hydraulic pump and the load pressure of the actuator, a controller for outputting control signals when the differential pressure detected by the detector means is different from a setting value, and valve means driven by the control signals, wherein the controller may include a storage means for storing a plurality of differential pressure target values, and arithmetic means for selecting one of the plurality of stored differential pressure target values in response to the instruction from the instruction means to then define the selected value as a setting value of the differential pressure. The differential pressure setting means may include the storage means and the arithmetic means of the controller.

DETAILED DESCRIPTION OF THE PREFERRED EMBODIMENTS

Hereinafter, preferred embodiments of the present invention will be described with reference to the drawings.

Figure 1:
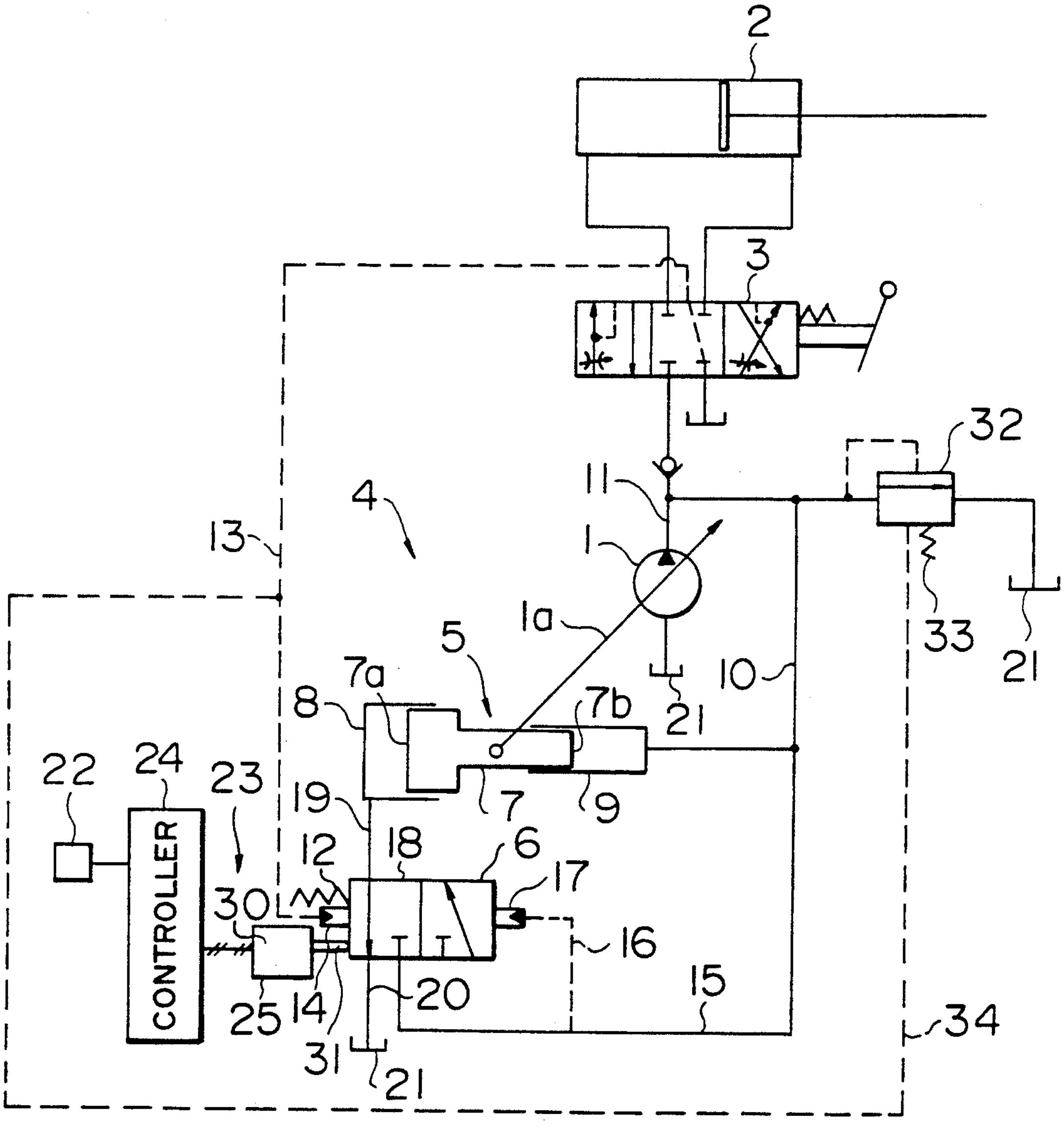
FIG. 1 is a diagram showing the schematic configuration of a hydraulic drive system according to a first embodiment of the present invention.

FIG. 1 is a circuit diagram showing the basic configuration of a first embodiment of the present invention. A hydraulic drive system according to this embodiment comprises a hydraulic pump 1 of the variable displacement type having a swash plate 1*a* which constitutes displacement volume varying means, a hydraulic actuator 2 driven by a hydraulic fluid discharged from the hydraulic pump 1, a directional control valve 3 for controlling a flow of the hydraulic fluid supplied from the hydraulic pump 1 to the actuator 2, and a discharge control device 4 for controlling a flow rate of the hydraulic fluid discharged from the hydraulic pump 1. The discharge control device 4 comprises a drive cylinder unit, i.e., regulator 5, for driving a swash plate 1*a* of the hydraulic pump 1 to control the displacement volume, and a load-sensing control device 6 for controlling operation of the regulator 5 to hold a differential pressure between a discharge pressure of the hydraulic pump 1 and a load pressure of the actuator 2 at a setting value, thereby controlling the discharge rate of the hydraulic pump 1.

The regulator 5 comprises a piston member 7 linked with the swash plate 1*a* of the hydraulic pump 1 and having a large-diameter pressure receiving portion 7*a* and a smaller-diameter pressure receiving portion 7*b* at the opposite ends, a first cylinder 8 into which is inserted the larger-diameter pressure receiving portion 7*a* of the piston member 7, and a second cylinder 9 into which is inserted the smaller-diameter pressure reciving portion 7*b* of the piston member 7. The second cylinder 9 is communicated with a discharge line 11 for the hydraulic pump 1 through a line 10.

The load-sensing control device 6 comprises a control valve 18 which includes a spring 12 for setting the differential pressure between the discharge pressure of the hydraulic pump 1 and the load pressure of the actuator 2, a drive part 14 supplied with the load pressure of the actuator 2 through a line 13, and a drive part 17 supplied with the discharge pressure of the hydraulic pump 1 through lines 15, 16. The force of the spring 12 is set to such a value that the differential pressure determined by the spring force becomes a level smaller than usual and suitable for the work which requires fine operation. The first cylinder 8 of the regulator 5 is connected to the control valve 18 through a line 19. When the control valve 18 is at a left-hand position as viewed on the drawing sheet, the first cylinder 8 is communicated with a tank 21 through a line 20 so that the pressure in the first cylinder 8 becomes equal to a tank pressure. When the control valve 18 is at a right-hand position as viewed on the drawing sheet, the first cylinder 8 is communicated with the discharge line 11 through the lines 15, 10 so that the pressure in the first cylinder 8 becomes equal to the discharge pressure of the hydraulic pump 1. When the control valve 18 is at an intermediate position, the first cylinder 8 is communicated with both the tank 21 and the discharge line 11 at the ratio corresponding to that position, so that the pressure in the first cylinder 8 reaches some level between the tank pressure and the pump discharge pressure corresponding to the position of the control value 18.

In addition to the above configuration, the hydraulic drive system of the first embodiment further comprises an instruction unit 22 operated from the exterior for instructing a change in the differential pressure between the discharge pressure of the hydraulic pump 1 and the load pressure of the actuator 2, and a differential pressure setting device 23 capable of changing the setting value of the differential pressure in response to the instruction from the instruction unit 22. The differential pressure setting device 23 comprises a controller 24 for computing and outputting a control signal, and a control force applying device 25 for producing a control force responsive to the control signal and for applying the control force to the control valve 18 on the side where the spring 12 is provided.

The instruction unit 22 is connected to the controller 24, and so arranged as to output an instruction signal when operated by an operator. In this embodiment, as described later, the instruction unit 22 is operated when instructing the differential pressure suitable for the ordinary work, and not operated when instructing the differential pressure smaller than usual and suitable for the work which requires fine operation.

Figure 2:
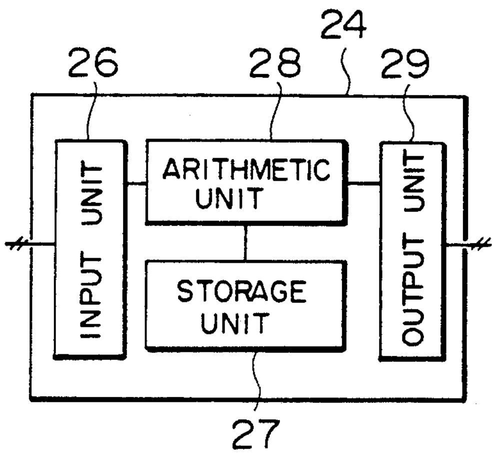
FIG. 2 is a block diagram showing the configuration of a controller equipped in the first embodiment.

The controller 24 includes, as shown in FIG. 2, an input unit 26 for receiving the instruction signal from the instruction unit 22, a storage unit 27 for storing a differential pressure modifying value utilized to obtain a differential pressure target value suitable for ordinary work, an arithmetic unit 28 for computing a control force corresponding to the differential pressure modifying value stored in the storage unit 27 in response to a signal output from the input unit 26, and an output unit 29 for outputting the control force computed by the arithmetic unit 28 as said control signal.

The control force applying device 25 comprises a solenoid unit 30 for receiving the control signal from the output unit 29 of the controller 24, and a plunger 31 driven by the solenoid unit 30. Upon receiving the control signal, the solenoid unit 30 produces the control force computed by the arithmetic unit 28, the control force being transmitted to the control valve 18 through the plunger 31.

In the discharge line 11 of the hydraulic pump 1, there is also provided an unload valve 32 which has a spring 33 for setting a minimum discharge pressure of the hydraulic pump 1 when the directional control valve 3 is at its neutral position. In order to ensure the differential pressure between the discharge pressure of the hydraulic pump 1 and the load pressure of the actuator 2, the load pressure is introduced through a line 34 to one end of the unload valve 32 on the same side as the spring 33, and the spring 33 is arranged to have a setting value somewhat larger than that of the spring 12 associated with the control valve 18.

Operation of the hydraulic control system of this embodiment thus constructed will be described below.

The hydraulic pump 1 is arranged such that when the swash plate 1*a* is at a minimum tilting position, the minimum discharge rate is ensured by an engine (not shown) set in operation. Thus, when the directional control valve 3 is at its neutral position, the minimum discharge rate produces a discharge pressure of the hydraulic pump 1 equal to the minimum discharge pressure determined by the unload valve 32. The minimum discharge pressure is introduced to the second cylinder 9 of the regulator 5. At the same time, the minimum discharge pressure is also introduced to the drive part 17 of the control valve 18, so that the control value 18 is driven into a state as shown in the right-hand position by overcoming the force of the spring 12, or the resultant of force of the spring 12 and control force from the control force applying device 25 when the latter is in operation. This also introduces the minimum discharge pressure to the first cylinder 8 of the regulator 5 through a line 15, whereupon the piston 7 is moved to rightward, as viewed on the drawing sheet, due to the difference in area between the pressure receiving portions 7*a* and 7*b* for holding the swash plate 1*a* of the hydraulic pump 1 at a minimum tilting position.

When the directional control valve 3 is switched under that condition, the hydraulic fluid is introduced from the hydraulic pump 1 to the actuator 2 through the directional control valve 3, whereupon the actuator 2 is driven to operate the working member (not shown). At the same time, the load pressure is generated in the actuator 2 and then introduced to the drive part 14 of the control valve 18 so that the control valve 18 is driven into a state as shown in the left-hand position. The first cylinder 8 is thus communicated with the tank 21 to move the piston 7 of the regulator 5 leftward, as viewed on the drawing sheet, for increasing the discharge rate of the hydraulic pump 1. This increase in the discharge rate is continued until the force due to the differential pressure between the discharge pressure of the hydraulic pump 1 and the load pressure of the actuator 2 is balanced by the force of the spring 12, or the resultant force of the spring 12 and control force from the control force applying device 25 when the latter is in operation. As a consequence, the discharge rate of the hydraulic pump 1 is controlled such that the differential pressure between the discharge pressure of the hydraulic pump 1 and the load pressure of the actuator 2 is held at a setting value determined by the force of the spring 12, or a setting value determined by both the force of the spring 12 and the control force from the control force applying device 25 when the latter is in operation.

The differential pressure between the discharge pressure of the hydraulic pump 1 and the load pressure of the actuator 2 in the above operation process is set to a different value responsive to an instruction issued from the instruction unit 22 shown in FIG. 1 for modifying the differential pressure. This will now be described with reference to a flowchart of FIG. 3 showing the control sequence carried out by the arithmetic unit 28 of the controller 24.

When the instruction unit 22 is operated in anticipation of performing ordinary work, an instruction signal is input to the controller 24. The arithmetic unit 28 of the controller 24 determines in steps S1 of FIG. 3 whether the instruction signal is input from the instruction unit 22 to the arithmetic unit 28 through the input unit 26 of the controller 24. Since the instruction signal is input in this case, the above determination is responded by YES and the control goes to step S2. In the step S2, the differential pressure modifying value stored in the storage unit 27 is read out, in response to the instruction signal, into the arithmetic unit 28 in which the control force is computed corresponding to that differential pressure modifying value. The control then goes to step S3 where a control signal is output from the arithmetic unit 28 to the control force applying device 25.

The control force applying device 25 shown in FIG. 1 is operated in response to the control signal, so that the plunger 31 pushes the end of the control valve 18 on the same side as the spring 12 with the control force computed by the arithmetic unit 28. The discharge rate of the hydraulic pump 1 is thus controlled such that the differential pressure between the discharge pressure of the hydraulic pump 1 and the load pressure of the actuator 2 becomes a setting value determined by the resultant force of the spring 12 and control force applied from the control force applying device 25. Accordingly, the hydraulic fluid is discharged from the hydraulic pump 1 at a relatively large flow rate and then supplied to the actuator 2. This allows the actuator 2 to be driven at a relatively large actuator speed corresponding to the stroke of the control lever for the directional control valve 3, as indicated by a characteristic line a in FIG. 4, with the result that the desired ordinary work can be performed by the working member (not shown) driven by the actuator 2.

Figure 3:
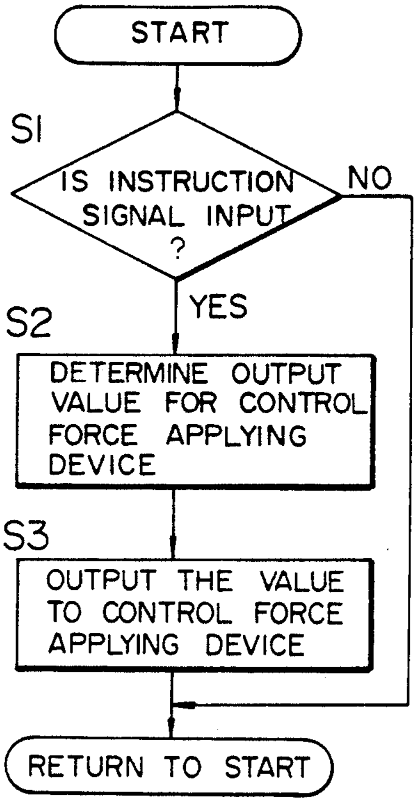
FIG. 3 is a flowchart showing the processing sequence implemented by the controller shown in FIG. 2.

On the other hand, when the instruction unit 22 is not operated in anticpation of performing special work which requires fine operation, no instruction signal is input to the arithmetic unit 28 of the controller 24, and hence the determination made in step S1 of FIG. 3 is responded by NO. Therefore, the arithmetic unit 28 does not carry out computation to determine the control force, and the discharge rate of the hydraulic pump 1 is so controlled as to produce the differential pressure corresponding with the force of the spring 12. Accordingly, the hydraulic fluid is discharged from the hydraulic pump 1 at a relatively small flow rate and then supplied to the actuator 2. This allows the actuator 2 to be driven at a relatively small actuator speed corresponding to the stroke of the control lever for the directional control valve 3, as indicated by a characteristic line b in FIG. 4, with the result that the working member (not shown) driven by the actuator 2 can perform special work, which requires fine operation, at the relatively small ratio of a change in the actuator speed to the stroke of the control lever.

Figure 4:
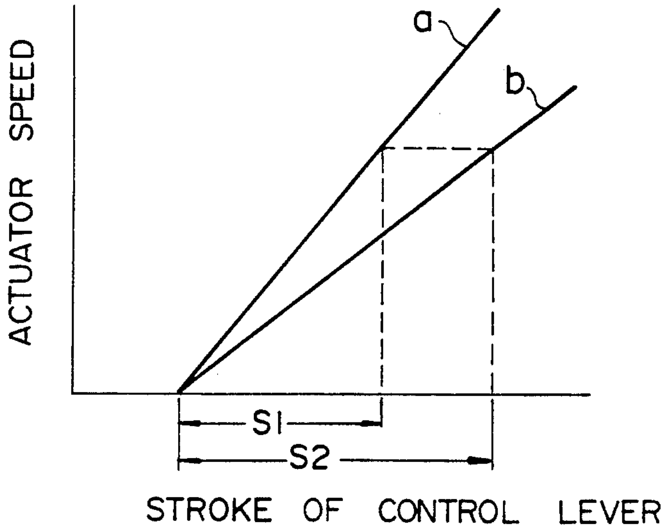
FIG. 4 is a graph showing characteristics obtained in the first embodiment.

According to the first embodiment, as described above, operating the instruction unit 22 increases the differential pressure between the discharge pressure of the hydraulic pump 1 and the load pressure of the actuator 2, thereby enabling the operation to perform ordinary work in a conventional manner. With the instruction unit 22 not operated, the differential pressure is lowered so that the flow rate supplied to the actuator 2 for the same stroke of the control lever as that for performing ordinary work is reduced to facilitate operation of the actuator 2 at a finely adjusted speed for permitting fine of the operation system with ease.

further, as will be seen from the characteristic lines a, b in FIG. 4, the stroke of control lever S2 necessary for reaching a certain actuator speed when the instruction unit 22 is not operated is larger than the stroke of control lever S1 necessary for reaching a certain actuator speed when the instruction unit 22 is operated. Namely, the metering region in the former case becomes larger than that in the latter case, and this allows the operator to feel less fatigued during operation.

In the foregoing embodiment, the value obtained by subtracting the differential pressure target value, given by the setting value of the spring 12, from the differential pressure target value suitable for the ordinary work is stored, as the differential pressure modifying value, in the storage unit 27 of the controller 24. But, it is also possible to store the differential pressure target value suitable for ordinary work as the differential pressure modifying value, and then subtract the differential pressure target value, given by the setting value of the spring 12, from that stored value in the arithmetic unit.

Figure 5:
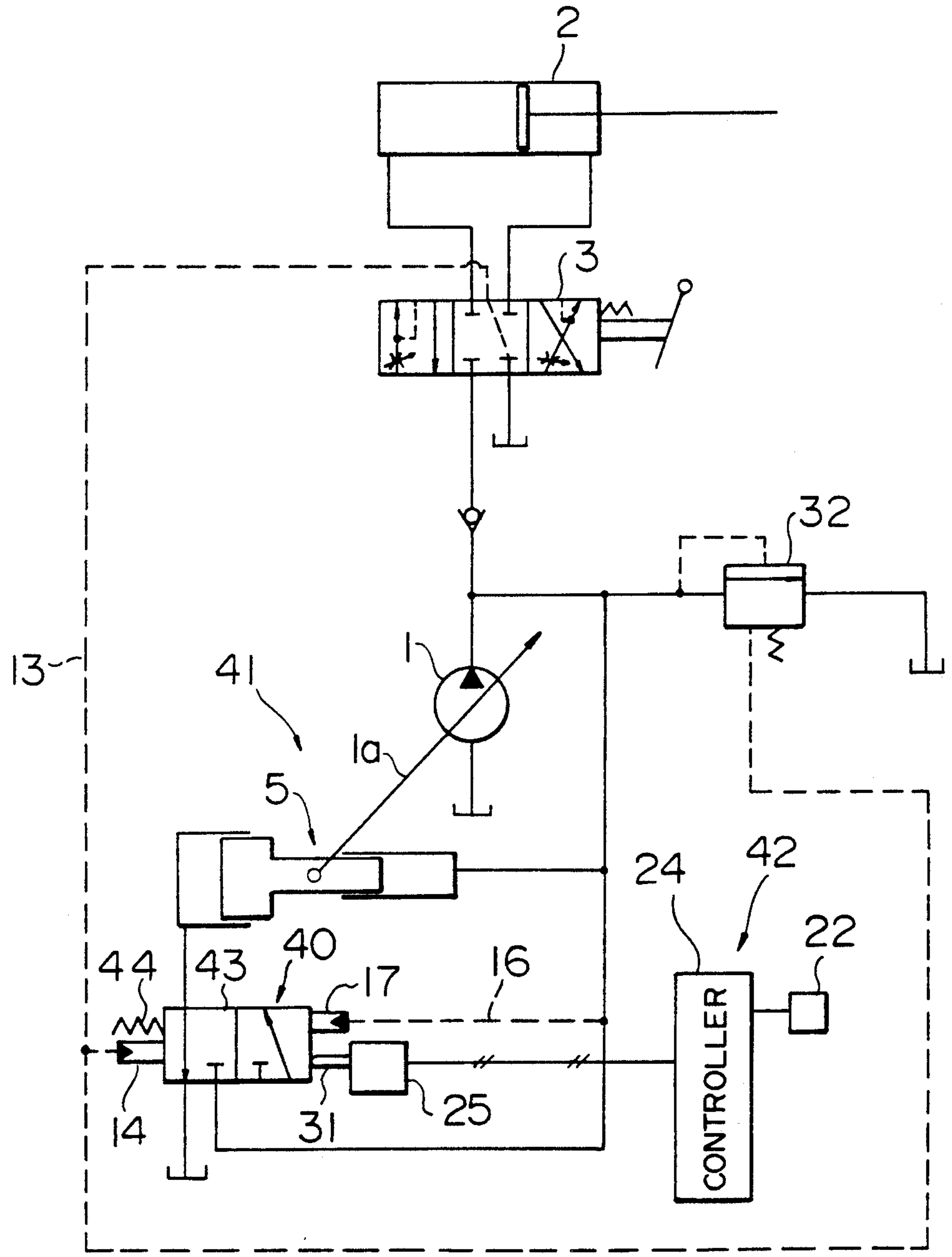
FIG. 5 is a diagram showing the schematic configuration of a hydraulic drive system according to a second embodiment of the present invention.

A second embodiment of the present invention will be described below with reference to FIG. 5. The second embodiment includes, similarly to the above first embodiment shown in FIG. 1, a discharge control device 41 comprising the regulator 5 and a load-sensing control device 40, and a differential pressure setting device 42 comprising the controller 24 and the control force applying device 25. In this embodiment, however, a spring 44 of a control value 43, which constitutes the load-sensing control device 40 and determines the differential pressure between the discharge pressure of the hydraulic pump 1 and the load pressure of the actuator 2, is set to provide such a spring force as the relatively large differential pressure suitable for ordinary work. Also, the control force applying device 25 is arranged to apply the control force of the plunger 31 to the end of the control value 43 on the side opposite to the spring 44, and the differential pressure modifying value stored in the arithmetic unit 27 (see FIG. 2) of the controller 24 is employed for obtaining the differential pressure target value suitable for the work which requires fine operation.

In the second embodiment thus constructed, when the instruction unit 22 is not operated, the control force applying device 25 shown in FIG. 1 is also not operated. Therefore, the discharge rate of the hydraulic pump 1 is controlled to produce the large differential pressure balanced by the force of the spring 44, resulting in the relationship between the stroke of the control lever and the actuator speed as indicated by the characteristic line a in FIG. 4. When the instruction unit 22 is operated, the control force applying device 25 is also operated, in a like manner to the first embodiment, to apply the control force in a direction opposite to the force of the spring 44 of the control valve 43. The discharge rate of the hydraulic pump 1 is thus controlled to produce the small differential pressure balanced by the difference between the force of the spring 44 and the control force, resulting in the relationship between the stroke of the control lever and the actuator speed as indicated by the characteristic line b in FIG. 4.

In this way, unlike the first embodiment, the second embodiment provides the differential pressure suitable for ordinary work when the instruction unit 22 is not operated, whereas it provides the differential pressure suitable for work which requires operation of the actuator 2 at a finely adjusted speed, when the instruction unit 22 is operated. The remaining operation and effect are the same as those in the first embodiment.

A third embodiment of the present invention will be described below with reference to FIGS. 6 and 7.

While the foregoing and second embodiments have been arranged as directly applying the discharge pressure of the hydraulic pump 1 and the load pressure of the actuator 2 to the opposite drive parts of the control valve, respectively, the third embodiment is arranged to make control using electric signals obtained dependent on the differential pressure between the discharge pressure of the hydraulic pump 1 and the load pressure of the actuator 2.

More specifically, in the third embodiment, a discharge control device 50 comprises the regulator 5 and a load-sensing control device 51. The load-sensing control device 51 comprises a differential pressure sensor 52 for detecting the differential pressure between the discharge pressure of the hydraulic pump 1 and the load pressure of the actuator 2 and then outputs it in the form of an electric signal, a controller 53 for receiving the detected signal from the differential pressure sensor 52, two solenoid selector valves 54, 55 driven by control signals from the controller 53, and a hydraulic source 56. The solenoid selector valve 54 is disposed in a line 57 communicating between the first clyinder 8 and the second cylinder 9 of the regulator 5, whereas the solenoid selector valve 55 is disposed in a line 58 communicating the first cylinder 8 with the tank 21. The hydraulic source 56 is connected to the second cylinder 9 through a line 59.

This embodiment also has the instruction unit 22 which is operated during the ordinary work as with the first embodiment, and which issues an instruction signal input to the controller 53.

The controller 53 includes, similarly to the controller 24 in the first embodiment shown in FIG. 2, the input unit 26, the storage unit 27, the arithmetic unit 28 and the output unit 29. The storage units 27 stores therein a relatively large first differential pressure target value Δ P LS01 suitable for ordinary work and a relatively small second differential pressure target value Δ P LS02 suitable for special work which requires fine operation. In this embodiment, the controller 53 serves also as differential pressure setting means capable of changing a setting value of the differential pressure responsive to an instruction from the instruction unit 22.

Figure 7:
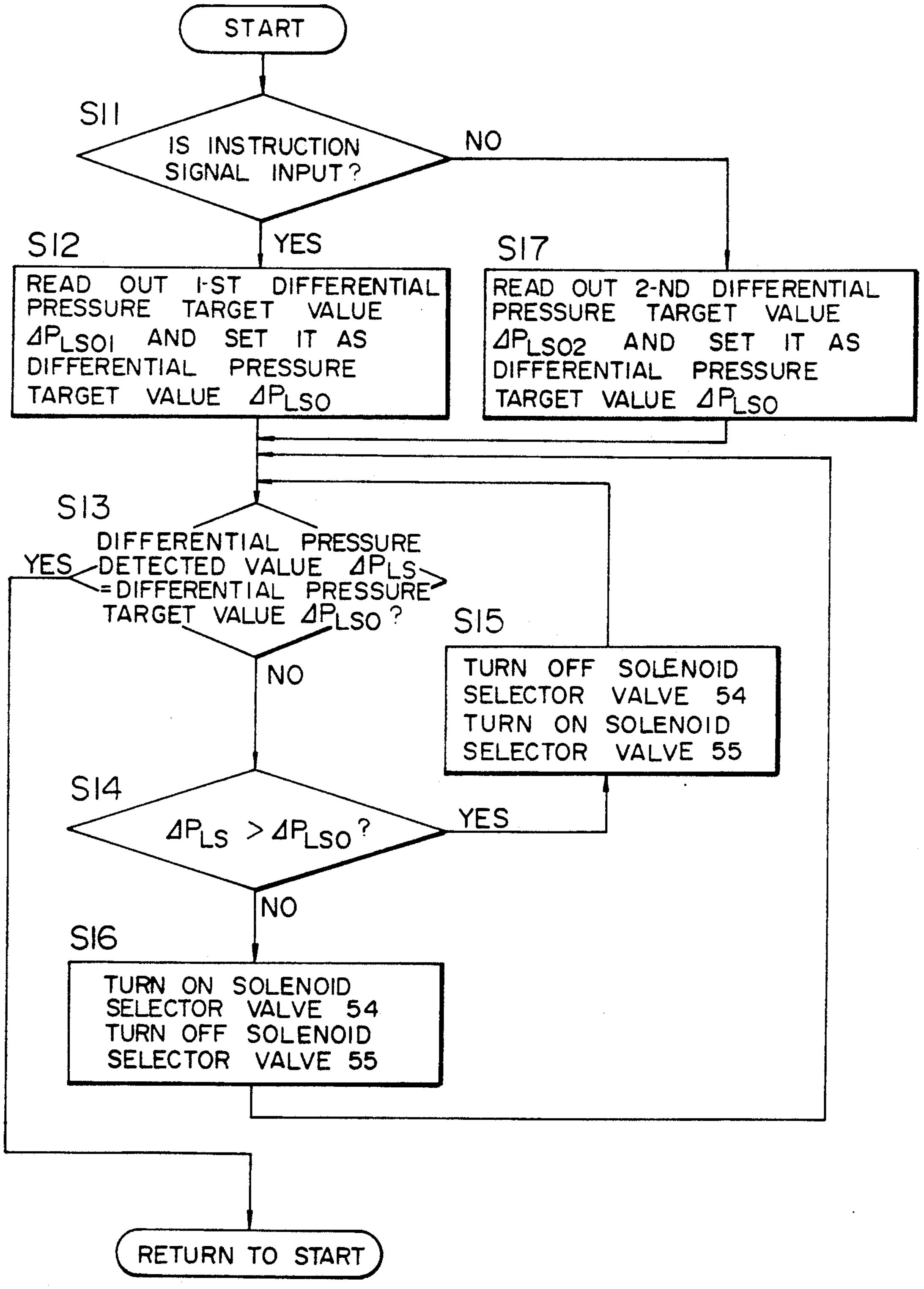
FIG. 7 is a block diagram showing the configuration of a controller equipped in the third embodiment.

More specifically, with the third embodiment, when the instruction unit 22 is operated in the driving of the actuator 2 upon operation of the directional control valve 3, the instruction signal is input to the controller 53, and the determination of step S11 indicated in FIG. 7 is made in the arithmetic unit 28 of the controller 53. In this case, since the response to that determination is by YES, the control goes to step S12. The step S12 reads the relatively large first differential pressure target value Δ P LS01 out of the differential pressure target values stored in the storage unit 27 of the controllers 53 into the arithmetic unit 28, as a differential pressure target value Δ P LS0,followed by proceeding to step P13.

The step P13 compares the differential pressure between the discharge pressure of the hydraulic pump 1 and the load pressure of the actuator 2 actually detected by the differential pressure sensor 52, i.e., differential pressure detected value Δ P LS, with the differential pressure target value Δ P LS0 in the arithmetic unit 28 of the controller 53. If these values are not equal to each other, the control goes to step S14. The step S14 determines whether or not the differential pressure detected value Δ P LS is larger than the differential pressure target value ΔP LSO. If so (YES), the control goes to step S15. In step S15 outputs control signals are outputted from the arithmetic unit 28 through the output unit 29, one of which turns off the solenoid selector valve 54 and the other of which turns on the solenoid selector valve 55, respectively.

Figure 6:
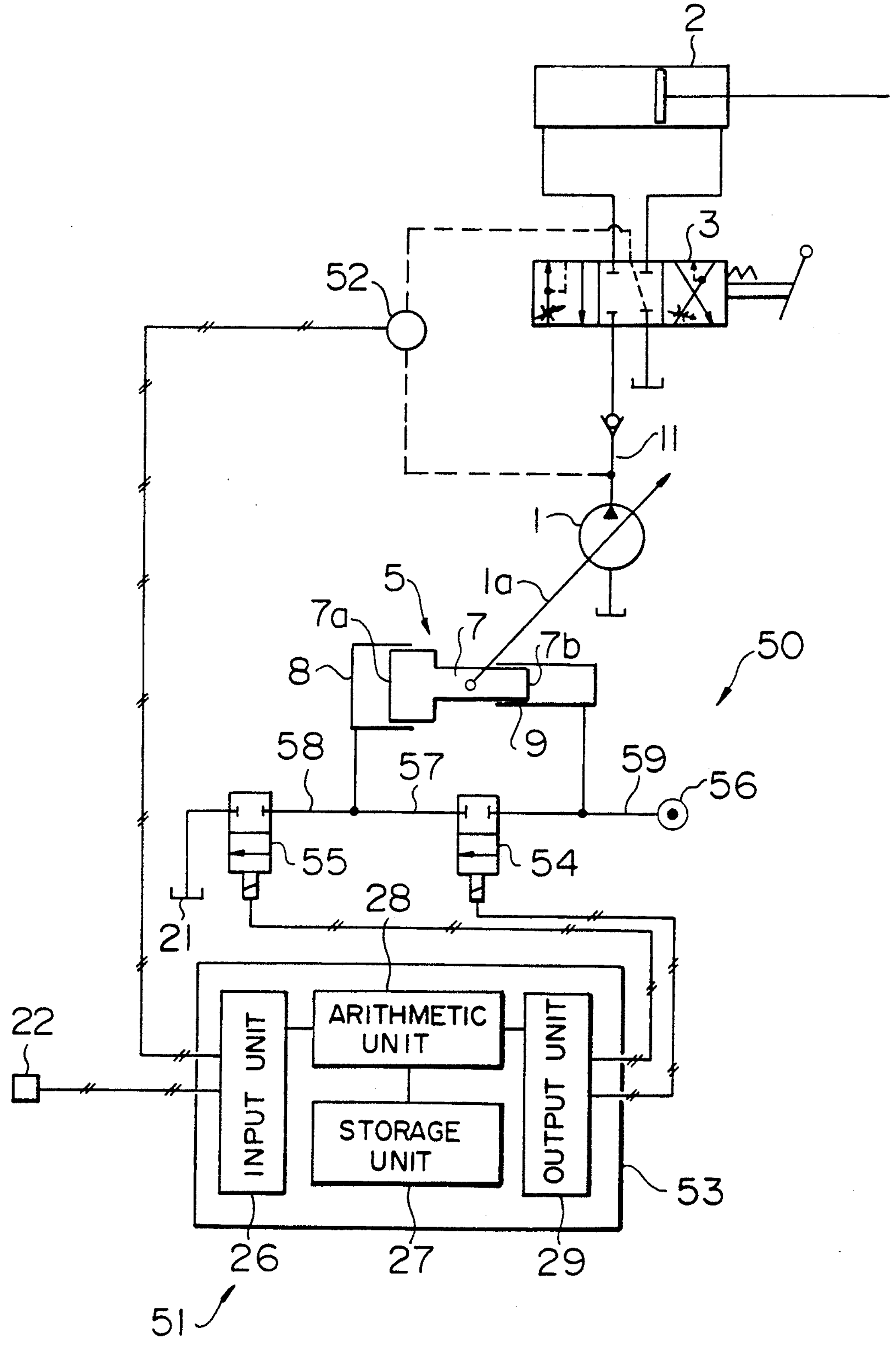
FIG. 6 is a diagram showing the schematic configuration of a hydraulic drive system according to a third embodiment of the present invention.

Thus, the solenoid selector valve 54 is held in a state as shown in FIG. 6, and the solenoid selector valve 55 is switched to a state as shown in the lower position for commuincating the first cylinder 8 of the regulator 5 with the tank 21. The piston member 7 of the regulator 5 is now moved leftward, as viewed on the drawing sheet, under the hydraulic pressure of the hydraulic source. As a result, the discharge rate of the hydraulic pump 1 is controlled for being reduced such that ΔP LS becomes equal to ΔP LSO.

If the response to the determination of the step S14 indicated in FIG. 7 is NO and the differential pressure detected value ΔP LS is smaller than the differential pressure target value ΔP LSO, the control goes to step S16. The step S16 outputs control signals from the arithmetic unit 28 through the output unit 29, one of which turns on the solenoid selector valve 54 and the other of which turns off the solenoid selector valve 55, respectively. Thus, the solenoid selector valve 55 is held in a state as shown in FIG. 6, and the solenoid selector valve 54 is switched to a state as shown in the lower position for communicating the hydraulic source 56 with both the first and second cylinders 8, 9 of the regulator 5. The piston member 7 of the regulator 5 is ow moved rightward, as viewed on the drawing sheet, due to the difference in area between the larger-diameter pressure receiving portion 7*a* and the smaller-diameter pressure receiving protion 7*b* of the piston member 7. As a result, the discharge rate of the hydraulic pump 1 is controlled for being increased such that ΔP LS becomes equal to ΔP LSO. If ΔP LS is determined to be equal to ΔP LSO in the step S13, the control returns to the start.

In other words, when the instruction until 22 is operated, the discharge rate of the hydraulic pump 1 is controlled to produce the differential pressure corresponding to the relatively large first differential pressure target value ΔP LS01, and the hydraulic fluid is supplied at the controlled flow rate from the hydraulic pump 1 to the actuator 2 through the directional control valve 3 for carrying out the ordinary work by the working member (not shown). The relationship between the stroke of the control lever for the directional control valve 3 and the actuator speed as established in this case is similar to the above-mentioned characteristic line as shown in FIG. 4.

Then, if the instruction unit 22 shown in FIG. 6 is not operated and the response to the determination of the step S11 in FIG. 7 is NO, the control goes to step S17. The step S17 reads the relatively small second differential pressure target value ΔP LS02 out of the differential pressure target values stored in the storage unit 27 of the controller 53 into the arithmetic unit 28, as a differential pressure target value ΔP LSO, followed by proceeding to step P13. The processing executed in the step 13 and the subsequent steps is the same as that in the above case, and hence the description is omitted here.

In other words, when the instruction unit 22 is not operated, the discharge rate of the hydraulic pump 1 is controlled to produce the differential pressure corresponding to the relatively small second differential pressure target value ΔP LS02, and the hydraulic fluid is supplied at the controlled flow rate from the hydraulic pump 1 to the actuator 2 through the directional control valve 3 for carrying out the work, which requires fine operation, by special working member (not shown). The relationship between the stroke of the control lever for the directional control valve 3 and the actuator speed as established in this case is similar to the above-mentioned characteristic line b shown in FIG. 4.

As with the foregoing first and second embodiments, the third embodiment can also make smaller the ratio of a change in the actuator speed to the stroke of the control lever for the directional control valve 3 during the special work which requires fine operation. Accordingly, the actuator 2 can be operated at a finely adjusted speed with ease, thus allowing the operator to feel less fatigued.

While the foregoing embodiments have been described as storing one differential pressure modifying value of two differential pressure target values in the storage unit of the controller, it is also possible to store two or more differential pressure modifying values or three or more differential pressure target values for more finely modifying the differential pressure between the discharge pressure of the hydraulic pump and the load pressure of the actuator dependent on the nature of the work to be carried out.

As described above, the present invention provides the advantageous effect on permitting the performing of ordinary work usually performed by hydraulic machines having theron the hydraulic drive system of the present invention, and of easily realizing the operation of the actuator at a finely adjusted speed for performing work which requires fine operation thus allowing the operator to feel less fatigued.

What is claimed is:

1. A hydraulic drive system having a hydraulic pump of the variable displacement type having displacement volume varying means, at least one hydraulic actuator driven by a hydraulic fluid discharged from said hydraulic pump, a directional control valve for controlling a flow of the hydraulic fluid supplied from said hydraulic pump to said actuator, and discharge control means for controlling a flow rate of the hydraulic fluid discharged from said hydraulic pump, said discharge control means including drive means for driving said displacement volume varying means and load-sensing control means for controlling operation of said drive means responsive to a differential pressure between a discharge pressure of said hydraulic pump and a load pressure of said actuator for holding said differential pressure at a setting value, said hydraulic drive system comprising:

instruction means operated exteriorly for instructing a change in the differential pressure between the discharge pressure of said hydraulic pump and the load pressure of said actuator;

differential pressure setting means for changing the setting value of said differential pressure in response to an instruction from said instruction means, said load-sensing control means including detector means for detecting the differential pressure between the discharge pressure of said hydraulic pump and the load pressure of said actuator, a controller for outputting control signals when the differential pressure detected by said detector means is different from a setting value, and valve means driven by said control signals, wherein said controller includes a storage means for storing a plurality of differential pressure target values, and arithmetic means for selecting one of said plurality of stored differential pressure target values in response to the instruction from said instruction means and then defines the selected value as a setting value of said differential pressure, and said differential pressure setting means includes said storage means and said arithmetic means of said controller.

2. A hydraulic drive system having a hydraulic pump of the variable displacement type having displacement volume varying means, at least one hydraulic actuator driven by a hydraulic fluid discharged from said hydraulic pump, a directional control valve for controlling a flow of the hydraulic fluid supplied from said hydraulic pump to said acturator, and discharge control means for controlling a flow rate of the hydraulic fluid discharged from said hydraulic pump, said discharge control means including drive means for driving said displacement volume varying means and load-sensing control means for controlling operation of said drive means responsive to a differential pressure between a discharge pressure of said hydraulic pump and a load pressure of said actuator for holding said differential pressure at a setting value, said hydraulic drive system comprising:

instruction means operated exteriorly for instructing a change in the differential pressure between the discharge pressure of said hydraulic pump and the load pressure of said actuator;

differential pressure setting means for changing the setting value of said differential pressure in response to an instruction from said instruction means, said differential pressure setting means including a controller having storage means for storing one of at least one differential pressure modifying value and at least one differential pressure target value, and arithmetic means for outputting a control signal in response to the instruction from said instruction means.

3. A hydraulic drive system according to claim 2 in which said load-sensing control means includes a control valve having a spring for setting said differential pressure and operated responsive to said differential pressure, wherein:

said includes storage means stores said at least one differential pressure modifying value, and said arithmetic means includes means for, in response to the instruction from said instruction means, determining whether to select said storage differential pressure modifying value and then output said differential pressure modifying value as said control signal when it is selected; and control force applying means for applying a control force corresponding to the control signal output from said arithmetic means to one of a pair of drive parts of said control value disposed opposite to each other.

4. A hydraulic drive system according to claim 3, wherein said control force applying means applies the control force in the same direction as the force of said spring.

5. A hydraulic drive system according to claim 3, wherein said control force applying means applies the control force in a direction opposite to the force of said spring.

* * * * *